United States Patent [19]

Worbois

[11] Patent Number: 4,586,755
[45] Date of Patent: May 6, 1986

[54] RAILWAY BRAKE CONTROL SYSTEM ARRANGED TO LIMIT MAXIMUM BRAKE PRESSURE DURING COMBINED INDEPENDENT AND AUTOMATIC BRAKE OPERATION

[75] Inventor: Robert J. Worbois, North Huntingdon, Pa.

[73] Assignee: American Standard Inc., Wilmerding, Pa.

[21] Appl. No.: 647,091

[22] Filed: Sep. 4, 1984

[51] Int. Cl.[4] .................. B60T 8/00; B60T 10/00; B60T 15/18
[52] U.S. Cl. ........................... 303/28; 303/13; 303/60; 303/68
[58] Field of Search ............ 303/14, 13, 28-46, 303/25-27, 23 R, 22 R, 22 A, 60, 66-67, 68, 80, 81-83, 84 R, 86, 18-19

[56] References Cited

U.S. PATENT DOCUMENTS

| | | | |
|---|---|---|---|
| 3,443,839 | 5/1969 | Hinrichs et al. | 303/13 X |
| 3,456,988 | 7/1969 | Gibbons et al. | 303/13 X |
| 3,597,013 | 8/1971 | Shah | 303/22 A |
| 4,013,322 | 3/1977 | Worbois et al. | 303/14 X |
| 4,223,953 | 9/1980 | Cruse | 303/13 X |
| 4,375,303 | 3/1983 | Tamamori | 303/13 X |

*Primary Examiner*—Douglas C. Butler
*Attorney, Agent, or Firm*—G. J. Falce

[57] ABSTRACT

A brake control system for a railway vehicle having separately operated independent and automatic brake controls for controlling brake pressure via a double check valve and a multi-piston relay valve, wherein an adjustable regulating valve is set to exhaust the independent brake control pressure acting on one piston of the multi-piston relay valve when the relay valve delivery pressure (brake cylinder pressure) exceeds a predetermined value, to thereby limit the maximum brake cylinder pressure attainable from the combined independent and automatic brake controls unless the automatic brake pressure exceeds that predetermined value.

7 Claims, 1 Drawing Figure

U.S. Patent May 6, 1986 4,586,755
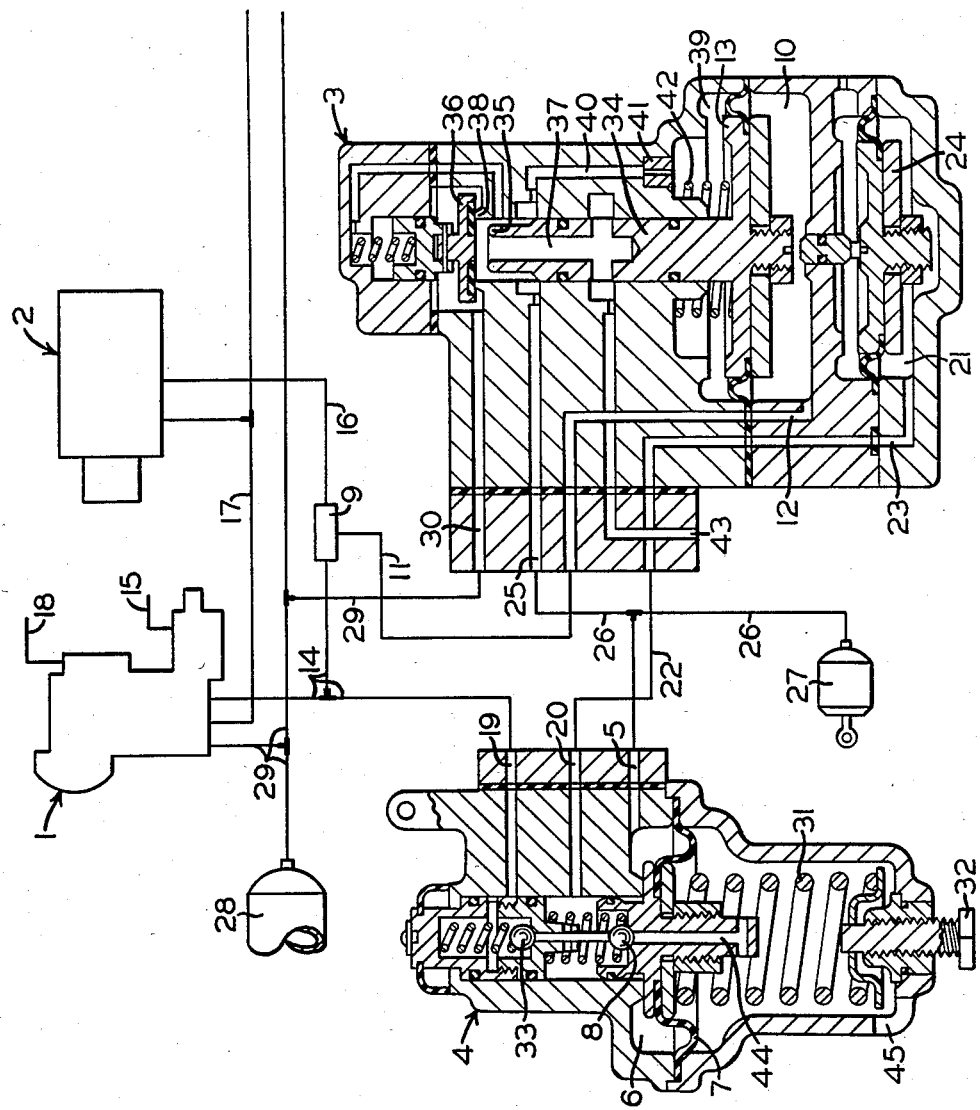

4,586,755

RAILWAY BRAKE CONTROL SYSTEM ARRANGED TO LIMIT MAXIMUM BRAKE PRESSURE DURING COMBINED INDEPENDENT AND AUTOMATIC BRAKE OPERATION

BACKGROUND OF THE INVENTION

The present invention is related to locomotive brake control apparatus and particularly to an arrangement employing step-up type relay valves.

Conventional 26-L type locomotive brake equipment employs a 26-C type, self-lapping, automatic brake valve having an automatic portion designed for regulating the train brake pipe pressure controlling both the locomotive and train brakes, and an independent portion arranged to apply and release the locomotive brakes independently of the train brakes. A double check valve connects the respective automatic and independent brake pressures to a relay valve, which in turn develops the locomotive brake cylinder pressure.

A step-up type relay valve is commonly employed by railroad properties to obtain independent brake forces greater than the automatic brake force. This is accomplished by employing two separate diaphragm control pistons. A main piston is subject to the greater of the automatic and independent brake pressures, while an auxiliary piston is subject to the independent brake pressure. Thus, when the independent brake is applied, both pistons are effective to pilot the relay valve such as to obtain the brake pressure, whereas only the main piston is effective to pilot the relay valve when the automatic brake is applied. Such an arrangement allows for more positive braking at low speeds, and provides better holding power when the train is at rest. However, these step-up relay valve arrangements have been found to cause rapid shoe wear and wheel damage due to excessive brake pressure, which can result when both the automatic and independent brakes are applied concurrently.

In order to counteract these excessive brake forces, a piloted two-position, three-way pneumatic valve has been used to limit the maximum brake cylinder pressure obtainable to a value which will avoid wheel damage and excessive shoe wear. Such arrangements typically employ a pneumatically piloted switch valve which vents the independent brake pressure from the auxiliary piston when a predetermined automatic brake pressure is produced. However, these arrangements have been found to be undesirable from a safety standpoint, in that a temporary reduction in brake cylinder pressure actually occurs when maximum effective braking is required, such as when making an emergency application on top of an independent application.

SUMMARY OF THE INVENTION

The object of the present invention is to provide a locomotive brake control arrangement which limits the maximum attainable locomotive brake pressure due to an independent application to a predetermined value without any drop-off from this maximum value when making an automatic brake application on top of the independent brake application. This maximum value will only be exceeded when the automatic brake pressure exceeds it in the absence of an independent brake application.

Briefly, this objective is achieved by connecting the output of an adjustable regulating valve to the auxiliary piston of a step-up relay valve, while the output of the relay valve is fed back to the regulating valve. The regulating valve output is thus varied in accordance with the relay valve output in order to prevent the relay valve output due to an independent application from exceeding the predetermined maximum value for which the regulating valve is adjusted.

In this way, overbraking (due to excessive brake pressure being produced when the independent brake is applied at maximum effectiveness concurrently with the automatic brake) is eliminated without an undesirable temporary reduction of braking pressure.

DESCRIPTION OF THE DRAWING

Other objects and attendant advantages of the invention will become apparent from the following more detailed explanation of the single FIGURE drawing of a preferred embodiment of the invention shown in sectional diagrammatic form.

DESCRIPTION AND OPERATION

The preferred embodiment includes a locomotive brake valve device 1, such as a standard 26-C Brake Valve, a locomotive control valve device 2, such as a standard 26-F Control Valve, a step-up relay valve device 3, such as a standard J-1.6-16 Relay Valve, and a maximum pressure valve 4, such as a modified N-1 Reducing Valve, all of these valve devices being manufactured by the Westinghouse Air Brake Division of American Standard Inc.

The standard N-1 Reducing Valve is modified to provide the maximum pressure valve 4 by the relocation of a feedback port 5 leading to the compensating chamber 6 above diaphragm piston 7 of the double valve assembly 8. In other respects, the maximum pressure valve 4 is identical to the standard N-1 Reducing Valves and has been designated N-2 Regulating Valve. In that these standard valves are conventional and well-known to those skilled in the art, no further explanation of the constructional details of these valves is deemed necessary for an understanding of the present invention.

A double check valve 9 has its output connected to a pressure chamber 10 of relay valve device 3 via a line 11 and passage 12. The pressure effective in chamber 10 acts on the underside of a main diaphragm piston 13. One inlet of double check valve 9 is subject to the independent brake pressure effective at line 14 in accordance with operation of handle 15 of the independent portion of brake valve 1, while the other inlet is subject to the automatic brake pressure effective at line 16 in accordance with operation of control valve device 2, such operation of control valve device 2 being in turn predicated on the variation of pressure in brake pipe 17 by operating the handle 18 of the automatic portion of brake valve device 1.

Line 14 is also connected to supply port 19 of maximum pressure valve 4. Delivery port 20 of valve 4 is connected to chamber 21 of relay valve device 3 via a line 22 and passage 23. The pressure effective in chamber 21 acts on the underside of auxiliary diaphragm piston 24. Feedback port 5 of maximum pressure valve 4 is connected to the delivery port 25 of relay valve device 3 by line 26, which also leads to brake cylinder device 27.

Compressed air is stored in main reservoir 28 for charging brake pipe 17 via line 29 when handle 18 of the automatic portion of brake valve device 1 is in release position, as is well known. Line 29 is also connected to supply port 30 of relay valve device 3.

In order to limit the maximum locomotive brake pressure to a safe value, the tension of control spring 31 is set by adjusting screw 32. The relay valve delivery pressure to brake cylinder 27 is effective in compensating chamber 6 of the maximum pressure valve 4 to counteract the spring force and thereby regulate delivery pressure to the relay valve auxiliary diaphragm piston. When both an automatic and independent brake application are effective concurrently, this regulation of the auxiliary piston pressure results in the relay valve delivery pressure to brake cylinder 27 being varied so as to not exceed a predetermined maximum pressure, unless the automatic brake pressure exceeds that value.

Assuming, for example, that a full independent brake application is made by operating handle 15 of brake valve device 1 through the zone of application, air stored under pressure in main reservoir 28 is connected by the independent brake valve portion to relay valve chamber 10 via line 14, one inlet of double check valve 9, line 11, and passage 12; and is concurrently connected to relay valve chamber 21 via line 14, port 19, the open supply valve 33 of the maximum pressure valve self-lapping assembly, port 20, line 22, and passage 23. Diaphragm pistons 13 and 24 exert an upward force on stem 34 having an annular exhaust valve seat 35 on its one end. As the exhaust valve seat 35 engages valve member 36, central exhaust passage 37 in stem 34 is closed and valve member 36 is concurrently lifted off annular supply valve seat 38 surrounding seat 35. With opening of supply valve seat 38, air under pressure in main reservoir 28 is connected to brake cylinder 27 via line 29, relay valve supply passage 30, the open supply valve 36, delivery passage 25, and line 26. At the same time, the developing brake cylinder pressure is connected from delivery passage 25 to the relay valve compensating chamber 39 via internal feedback passage 40 and choke 41. This pressure in chamber 39 acts downwardly on piston 13 to counteract the upward acting forces on pistons 13 and 24. When these forces and the force of return spring 42 reach a balanced condition, the piston valve assembly assumes a lap position in which further supply of brake cylinder pressure is terminated, while continuing to interrupt the exhaust of brake cylinder pressure.

The pressure supplied to brake cylinder 27 is also connected to compensating chamber 6 of maximum pressure valve 4. It will be understood, however, that the maximum pressure setting of valve 4 by screw 3 is such that the force exerted on diaphragm piston 7 by this pressure acting in compensating chamber 6 is insufficient to overcome the tension of spring 31. Accordingly, maximum pressure valve 4 is normally maintained in supply position wherein supply valve 33 remains open and exhaust valve 8 remains closed during operation of the independent brake.

When handle 15 is moved to release position, line 14 is vented at the independent portion of brake valve device 1, thereby reducing the pressure in chamber 21 via passage 23, line 22, passage 20, open supply valve 33, port 19 and line 14. At the same time, the pressure in chamber 10 is vented via passage 12, line 11, double check valve 9 and line 14. This reduction of pressure in relay valve chambers 10 and 21 unbalances the piston valve assembly toward release position, in which position the pressure in brake cylinder 27 is exhausted via line 26, passage 25, unseated exhaust valve 35, exhaust passage 37 in stem 34 and exhaust port 43. It will be understood that this exhaust of the independent brake pressure can be obtained in graduated increments, if desired, depending upon the degree of movement of handle 15 toward full release position.

If it is desired instead to make an automatic brake application, brake valve handle 18 is moved into the service zone of application or into emergency position, depending upon the type of automatic brake application desired. Whatever the case, a reduction of pressure occurs in brake pipe 17, to which control valve device 2 is operatively responsive to supply either service or emergency pressure to the other inlet of double check valve 9. This pressure is connected to relay valve chamber 10 via line 16, double check valve 9, line 11, and passage 12, while chamber 21 remains vented, by reason of the independent brake being released, as previously explained. Accordingly, relay valve 3 is actuated to application position in accordance with the pressure supplied to the single diaphragm piston 13 to obtain brake pressure in a manner similar to that previously explained for the independent brake, it being understood, however, that only the single diaphragm piston 13 of the relay valve is effective in applying the automatic brake, as compared to the dual pistons 13 and 24 being effective to apply the independent brake. It will be apparent, therefore, that the independent brake has the ability to produce a higher maximum brake pressure than the automatic brake.

The arrangement, according to the present invention, prevents the brake pressure due to the independent brake from exceeding a predetermined maximum, as might otherwise occur in the event both the independent and automatic brakes are applied concurrently.

For example, if the independent brake is applied at maximum pressure, as heretofore explained, and the automatic brake is then applied, the automatic brake pressure will be connected to relay valve chamber 10 via double check valve 9 when the automatic brake pressure in line 16 exceeds the independent brake pressure in line 14. Relay valve 3 is forced to application position in response to this additional pressure force on the piston valve assembly. As supply valve 36 is accordingly lifted off its seat 38, pressurized air is connected from main reservoir 28 to brake cylinder 27 and also to compensate chamber 6 of maximum pressure valve 4, as previously explained.

In the event the combined independent and automatic brake pressure exceeds a desired value; i.e., a value corresponding to the setting of maximum pressure valve 4, as established by the tension to which spring 31 is adjusted by screw 32, the pressure effective in compensating chamber 6 will counteract this spring force sufficiently to urge piston 7 downwardly from its normal supply position to a release position in which supply valve 33 is closed and exhaust valve 8 is opened. In release position, the pressure in relay valve chamber 21 is exhausted via passage 23, line 22, port 20, the open exhaust valve, a central passage 44 in piston 7, the chamber housing spring 31, and a vent port 45. This results in the upward acting pressure force on relay valve 3 being diminished by an amount corresponding to that by which the combined independent and automatic brake pressure exceeds the maximum pressure setting of valve 4. The relay valve piston assembly is accordingly unbalanced toward release position, in which supply valve 26 is closed by engagement with seat 38 to terminate any further supply of air to brake cylinder 27, while concurrently exhaust valve 35 is opened to exhaust brake cylinder pressure. Since the pressure in relay valve compensating chamber 39 is exhausted with the brake cylinder pressure, a force balance will be restored across the relay valve piston assembly, at which time the relay valve 3 will be restored to a lap condition in which the supply and exhaust of brake cylinder pressure is terminated; i.e., the brake pressure is maintained constant at a value corresponding to the maximum pressure setting of valve 4.

In this manner, the independent brake control pressure acting on diaphragm piston 24 of relay valve 3 is regulated such that the brake cylinder pressure produced in accordance with the combined independent and automatic brake control pressures is prevented from exceeding a predetermined pressure. Moreover, there is no drop-off of brake pressure below the predetermined maximum brake pressure due to the regulating action of maximum pressure valve 4.

Having now described the invention, what I claim as new and desire to secure by Letters Patent, is:

1. A railway vehicle brake control system comprising:
   (a) means for providing a first brake control pressure;
   (b) means for providing a second brake control pressure;
   (c) actuator means operative in response to the supply of fluid brake pressure thereto for applying the vehicle brakes;
   (d) a relay valve having a first control chamber to which said first brake control pressure is connected, and a first control piston operative in said first control chamber in response to said first brake control pressure acting on one side thereof, and a second control chamber to which said second brake control pressure is connected, and a second control piston operative in said second control chamber in response to said second brake control pressure acting on a side corresponding to said one side thereof, and valve means operated by movement of either one of said first and second control pistons in a first direction for establishing said fluid brake pressure at said actuator means in accordance with the combined force of said first and second brake control pressures acting on said first and second control pistons; and
   (e) regulating valve means for connecting one of said first and second brake control pressures to said one of said first and second control chambers and for exhausting said one of said first and second brake control pressures in response to said fluid brake pressure exceeding a predetermined value to thereby limit the maximum attainable fluid brake pressure established at said actuator means.

2. A railway vehicle brake control system, as recited in claim 1, wherein said one of said first and second control pressures is said first control pressure.

3. A railway vehicle brake control system, as recited in claim 2, wherein said regulating valve means comprises:
   (a) a third control piston;
   (b) a control spring acting on one side of said third control piston;
   (c) a compensating chamber formed on the opposite side of said third control piston to which said fluid brake pressure is connected to exert a force on said third control piston in a direction to counteract the opposing force of said control spring;
   (d) a delivery chamber via which said first brake control pressure is connected to said first control piston; and
   (e) a normally closed exhaust valve in said delivery chamber operable to an open position in response to movement of said third control piston when said fluid brake pressure exerts a force thereon sufficient to overcome the opposing force of said control spring to thereby connect said first control chamber to atmosphere.

4. A railway vehicle brake control system, as recited in claim 3, further comprising:
   (a) a double check valve having one inlet to which said means providing said first brake control pressure is connected, a second inlet to which said means providing said second brake control pressured is connected, and an outlet via which said first and second means providing the higher of said first and second brake control pressures is connected to said second control piston; and
   (b) said regulating valve means further comprising a supply valve in said delivery chamber operable in concert with said exhaust valve in response to movement of said third control piston, said supply valve being normally open to admit said first brake control pressure to said first control chamber and being closed to terminate further supply of said first brake control pressure to said first chamber when the force of said fluid brake pressure acting on said third piston exceeds the opposing force of said control spring.

5. A railway vehicle brake control system, as recited in claim 4, wherein said regulating valve means further comprises screw means for selectively adjusting the tension of said control spring.

6. A railway vehicle brake control system, as recited in claim 2, wherein said relay valve further comprises a compensating chamber formed on the side of said second control piston opposite the side subject to said control pressure to which compensating chamber said fluid brake pressure is connected to exert a force on said second control piston in a direction to counteract the opposing combined force of said first and second brake control pressures acting on said one and said corresponding sides of said first and second control pistons.

7. A railway vehicle brake control system, as recited in claim 2, wherein said valve means is operated in response to operation of said second control piston in a direction opposite said first direction to connect said fluid brake pressure at said brake means to atmosphere.

* * * * *